United States Patent [19]
Yamamoto et al.

[11] 3,943,570
[45] Mar. 9, 1976

[54] SEMICONDUCTOR MAGNETIC HEAD
[75] Inventors: Naoki Yamamoto; Kikuji Sato, both of Kokubunji; Tetsu Oi, Tokyo, all of Japan
[73] Assignee: Hitachi, Ltd., Japan
[22] Filed: Sept. 13, 1974
[21] Appl. No.: 505,972

[30] Foreign Application Priority Data
Sept. 28, 1973  Japan.............................. 48-108397
Mar. 1, 1974    Japan.............................. 49-23312
May 20, 1974    Japan.............................. 49-55425

[52] U.S. Cl. .................. 360/112; 324/45; 360/125
[51] Int. Cl.² ...................... G11B 5/38; G01R 33/02
[58] Field of Search ........... 360/112, 110, 114, 125, 360/123, 122, 127; 324/45–46; 29/DIG. 22; 307/309; 317/235

[56] References Cited
UNITED STATES PATENTS

| | | |
|---|---|---|
| 2,914,728 | 11/1959 | Brophy et al. ........................ 324/45 |
| 3,082,507 | 3/1963 | Kuhrt et al. ........................ 328/32 H |
| 3,202,913 | 8/1965 | Marinace .............................. 324/45 |
| 3,260,980 | 7/1966 | Weiss................................. 360/112 |
| 3,296,573 | 1/1967 | Heid et al. ............................ 324/45 |
| 3,643,035 | 2/1972 | Tsukagoshi ......................... 360/112 |
| 3,657,806 | 4/1972 | Simon................................. 360/125 |
| 3,661,570 | 5/1972 | Moss.................................. 360/125 |

Primary Examiner—Alfred H. Eddleman
Attorney, Agent, or Firm—Craig & Antonelli

[57] ABSTRACT

A semiconductor magnetic head in which a polycrystal thin film of a semiconductor material containing at least a crystal particle having a longitudinal diameter of at least 30 μm is employed as a magneto-sensitive element is disclosed. The semiconductor thin film containing the crystal particle of the longitudinal diameter at least 30 μm can be easily formed with a good reproducibility by evaporating the semiconductor material on an insulation film containing not less than 3 mol % of alumina and then being subjected to a zone melting treatment.

17 Claims, 10 Drawing Figures

SEMICONDUCTOR MAGNETIC HEAD

FIELD OF THE INVENTION

The present invention relates to a magnetic reproducing head in which a Hall element or magneto-resistance element (hereinafter called a magneto-sensitive element) consisting of a semiconductor thin film such as of indium antimonide (InSb) is used as a generator device for the playback head.

DESCRIPTION OF THE PRIOR ART

Figure 1:
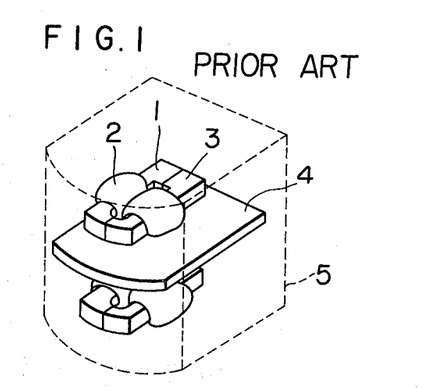
FIG. 1 is a schematic perspective view of a hitherto known magnetic head of a winding type.

Magnetic heads which have heretofore generally been employed either for playback, erasing or recording have a common construction wherein head core assembly comprising cores 1 and 3 of a magnetic material each provided with respective windings 2 is magnetically shielded from a similar core assembly usually by means of a magnetic shield plate 4 and both core assemblies are accommodated within a common shield housing 5, as is shown in FIG. 1. The magnetic head having a plurality of such core assemblies in a unit is called a multi-channel magnetic head. It is however known that the magnetic head core assembly having the windings is not suited for the manufacture of the multi-channel magnetic head, because the windings require a relatively large space. Further, since the output of the magnetic head of the winding type is varied in proportion to the rate of change in the magnetic flux produced by a magnetic recording medium such as a magnetic tape, the output power of the head is lowered when the rate of change of the magnetic flux is decreased. For this reason, the magnetic head of the winding type is not entitled to be used for the application where the lowering of the reading speed is desired. The magnetic head of this type has an additional disadvantage that any possible instability in the feeding speed of the magnetic recording medium would bring about a corresponding variation in the output avairable from the head so that a reliable reproduction can not be assured.

Lately, magnetic head has been developed in which a Hall generator element or magneto-resistance element in a form of a semiconductor film is used in place of the windings as the generator element for the playback head. By virtue of the use of such magneto-sensitive semiconductor element, miniaturization of the generator device can be easily achieved and at the same time extremely fine making of the head structure will become practicable if man resorts to the high advanced manufacturing technique for semiconductor integrated circuits. As a result of that, the manufacturing of the multi-channel magnetic playback head which has been difficult in case of the winding type head of the conventional art as above described can now be carried out very easily. Besides, since the semiconductor magneto-sensitive element produces the output signal having magnitude which is proportional to the flux per se produced by the magnetic recording medium, there will arise no difficulty from which the playback magnetic head of the winding type can not be evaded as above mentioned.

The semiconductor magneto-sensitive playback head which provides various advantages as above described is however considerably inferior to the winding type head in respect of the signal-to-noise or SN ratio. In other words, in case of the semiconductor magnetic head, the semiconductor itself provides a noise source in addition to various noise sources that the winding type magnetic head possesses inherently. This is a serious problem particularly in case of the magnetic head for an audio-frequency signal.

Figure 2A:
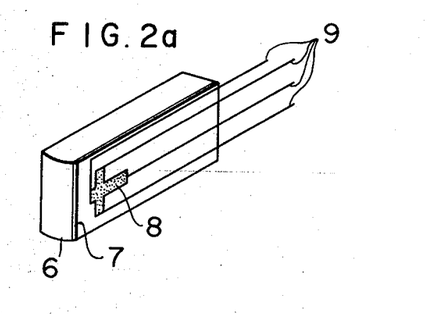
FIGS. 2a and 2b are schematic perspective views to illustrate a structure of one channel semiconductor magnetic head.
Figure 2B:
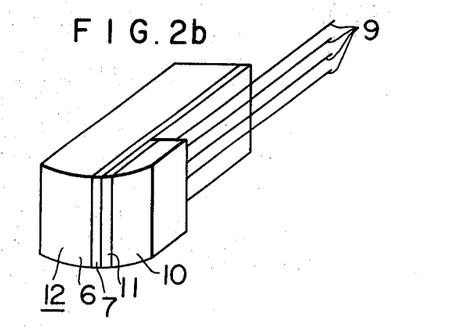
Figure 3:
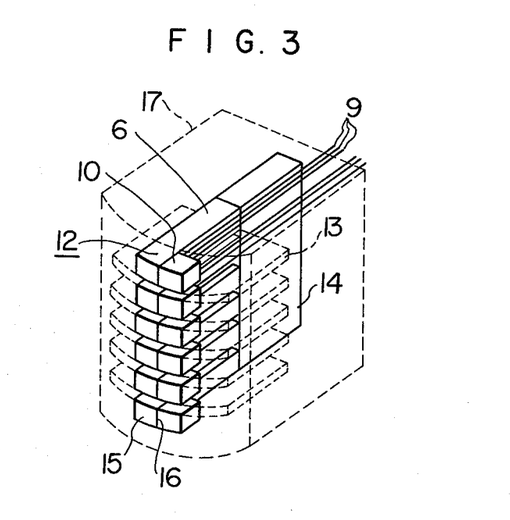
FIG. 3 is a perspective view of a multi-channel semiconductor magnetic head of a front gap type to illustrate the structure thereof.

FIGS. 2a and 2b are schematic perspective views to illustrate a structure of a conventional semiconductor magnetic head for single channel. As is shown in FIG. 2a, a semiconductor magneto-sensitive element 8 is disposed on a first magnetic substrate 6 of a high permeability by way of an interposed first insulation layer 7. Lead wires 9 are attached to the magneto-sensitive element 8 for external connections. A second magnetic body 10 having a high permeability is superposed over the semiconductor magneto-sensitive element 8 with a second insulation layer 11 interposed therebetween to thereby form a semiconductor magnetic head assembly 12 for a single channel, as can be seen from FIG. 2b. The semiconductor magneto-sensitive element is thus positioned at an active gap formed by the pair of the magnetic members 6 and 10, which gap is disposed substantially in perpendicular to a magnetic recording medium such as a megnetic tape. There have been proposed two kinds of the semiconductor magnetosensitive heads, i.e. a front gap type having the gap formed by the two magnetic cores at the front side of the head and a rear gap type head having the corresponding gap at the rear side of the head. A plurality of these semiconductor magnetic heads can be assembled into a unit to form a multi-channel magnetic head. FIG. 3 shows an example of such multi-channel semiconductor magnetic head of the front gap type. In this figure, reference numerals 6 and 10 indicate magnetic cores having high permeability, 9 denotes lead wires for external connections, 12 the single channel magnetic head, 13 magnetic shield plates, 14 a terminal plate, 15 sliding contact surfaces for a magnetic tape, 16 a magnetic gap formed by the magnetic cores 6 and 10, and numeral 17 indicates a shield case.

In the conventional magnetic heads having semiconductor magneto-sensitive elements incorporated therein, the semiconductor element which cosists of indium antimonide in most cases is employed generally in a form of (1) evaporated film or alternatively (2) thin foil piece formed by polishing a single crystal. These conventional magneto-sensitive elements are, however, subjected to various drawbacks. In case of the magnetic head in which the evaporated film is employed as the magneto-sensitive element, current noise is remarkable due to the grain boundary scattering of electrons because of the film being a poly-crystal, as a result of which a satisfactory SN ratio cannot be obtained. To deal with such drawback, it is known to anneal the film at a temperature lower than the melting point of indium antimonide. This method, however, can not result in a sufficient reduction of the current noise. On the other hand, when the thin foil piece formed by polishing the single crystal is used, the current noise certainly becomes negligible. However, it is technically extremely difficult to manufacture the foil piece of a thickness less than 2 microns by the polishing process with a good reproducibility.

SUMMARY OF THE INVENTION

An object of the invention of the present application is therefore to provide a semiconductor magnetic head which is evaded from the above mentioned disadvantages of the prior known magnetic head and which can be easily manufactered at reasonable costs.

Another object of the present invention is to provide a semiconductor magnetic head which is remarkably improved in respect of the noises.

To accomplish the above and other objects which will become more apparent from the following description of the preferred embodiment of the invention, there is provided according to the invention a semiconductor magnetic head in which a polycrystalline line thin film of a semiconductor material containing at least one crystal particle preferably having a longitudinal diameter of at least 30 $\mu$m is used as the magneto-sensitive element.

DETAILED DESCRIPTION OF THE PREFERRED EMBODIMENTS

Figure 4A:
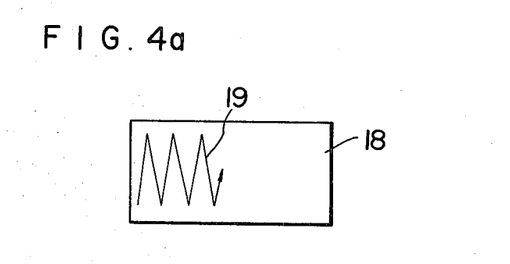
FIGS. 4a and 4b are to illustrate processes for zone melting a polycrystalline thin film of a semiconductor material.
Figure 4B:
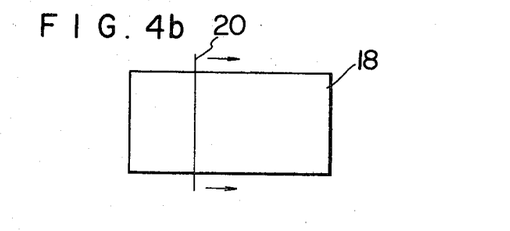

As described just above, according to the invention, a semiconductor thin film containing at least one crystal particle having a longitudinal diameter of at least 30 $\mu$m inclusive is formed on a substrate of a high permeability material and is used as the magneto-sensitive element for the magnetic head. For the deposition of the semiconductor thin film on the high permeability substrate, it is most convenient to employ an evaporating method. However, because crystal particles of the film produce by the evaporating process are very fine as aforementioned, it is impossible to obtain crystal particles of a longitudinal diameter of at least 30 $\mu$m with the usual annealing process. According to the invention, it has been found that the polycrystalline thin film containing desired crystal particles can be produced by a zone melting method utilizing irradiation by electron beam, heating by a nicrom fine wire or the like. The zone melting of the thin film can be carried out by irradiating the semiconductor thin film 18 with the electron beam successively as indicated by line 19, as is shown in FIG. 4b or alternatively by successively displacing a heating wire 20 such as electrically energized nicrom filament in the direction indicated by arrow in FIG. 4b. It has further been found that a magnetic head having an improved characteristic can be obtained by interposing an alumina film or alternatively a film or layer containing alumina between the semiconductor thin film and the high permeability substrate.

In order to have better understanding of the invention, an example of the magnetic head having the magneto-sensitive element manufactured according to the hitherto known method, that is, the evaporated film subjected to the annealing treatment will be at first described for reference.

EXAMPLE FOR REFERENCE

The surface of a nickel zinc ferrite substrate subjected to polishing finish was coated with an alumina silicate glass film having a thickness of 0.1 to 1.0 micron by a high frequency sputtering method and subsequently InSb thin film having a thickness of 2 microns was deposited thereon by evaporation, which was effected in accordance with a well known flush method with the temparature of the substrate set at 350°C. Alternatively, a three temperature evaporation method may be employed to this end. Upon the X-ray refraction examination, it has been found that the composition of the obtained film was at a stoichiometrical ratio and no hetero-structure or deviation (of indium or antimony) was observed. Additionally, an indium film having a thickness of 100 to 1000 A was deposited on the surface of the indium antimonide film by evaporation and thereafter subjected to oxidation in air at the temperature of 350°C for 10 minutes to form indium oxide film for protection. The thus obtained product was uniformly annealed for 80 minutes in the atmosphere of argon at 510°C which is lower than the melting point of InSb by 15°C.

Finally the protection film of indium oxide was removed by the buff polishing and the exposed thin film of indium antimonide was etched by a conventional photo-etching process to form a Hall element.

Figure 5:
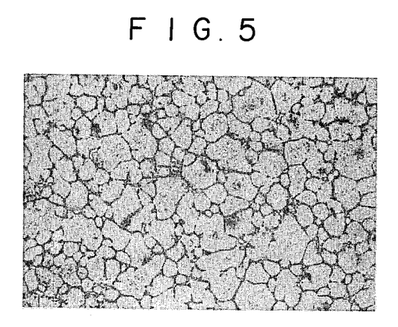
FIGS. 5 and 6 are microscopic photographs to show structures, respectively, of an evaporated film of InSb and the film thereof obtained after having been subjected to a zone melting treatment.

A part of thus obtained semiconductor film was etched by alcohol solution of hydrochloric acid and picric acid and observed through a microscope to examine the size of crystal particles. It was found that the diameter of particle in average was in the order of 15 microns and the diameter of the greatest a particle as found here and there did not go beyond 30 microns. The result tells that the crystal particles having a longitudinal diameter of at least 30 microns can not be produced by the conventional method as above described. FIG. 5 shows a photograph of the produced indium antimonide thin film taken through a microscope of 400 magnifications, from which one can see configurations and sizes of crystal particles.

Galvano-magnetic characteristic of the Hall element manufactured in the manner as above mentioned was examined with control current $I_H$ of 10 mA and magnetic flux density B of 3G. The result was that the Hall electromotive force S = 1.0 ± 0.1 mV and current noise N = 1.5 ± 0.3 $\mu$V at the frequency band ranging from 50 Hz to 10 KHz. These values disqualify the Hall element to be practically used in the magnetic head for reproducing signal with a good SN ratio.

In reality, the above Hall element was sandwiched between oppositely disposed pieces of nickel zinc ferrite each coated with an insulation layer and assembled into a magnetic head to measure the performances thereof with a standard magnetic tape having magnetism of 200 m Maxwel/cm according to JIS (Japanese Industrial Standards). It was found that, when the control current $I_H$ = 10 mA, the electromotive force S' = 2.7 ± 0.2 mV and the current noise N' = 1.5 ± 0.3 $\mu$V. It will be understood that the attained SN ratio is very dissatisfactory for a practicable magnetic head.

When the semiconductor thin film was evaporated relatively thicker in the order of 6 microns and then thinned by lapping to a thickness of 2 microns, the current noise can be reduced to some degree. However, it was found that the current noise of the Hall element nevertheless amounts to about 1.0 ± 0.1 $\mu$V, which can never be satisfactory.

It will be apparent from the foregoing description that any desired magneto-sensitive element can not be manufactured by the hitherto known method. Now, the invention will be described in detail with reference to several examples of the magnetic elements incorporating therein the magneto-sensitive elements prepared according to the invention.

EXAMPLE 1

Indium antimonide thin film was produced under the same conditions as was in the case of the aformentioned example for reference except that the zone melting process was adopted in place of the annealing step. Namely, a heating wire maintained at 800°C in the atmosphere of 99.99 % of helium gas was disposed in the vicinity of the film surface of indium antimonide provided with a protection layer of indium oxide and moved along the surface, as a result of which a molten zone produced immediately below the heating wire was displaced throughout the length of the specimen to thereby accomplish the zone melting treatment of the film.

Subsequently, the protection layer was removed and a Hall element was produced through the photo-etching method in the same manner as in the preceding example.

Figure 6:
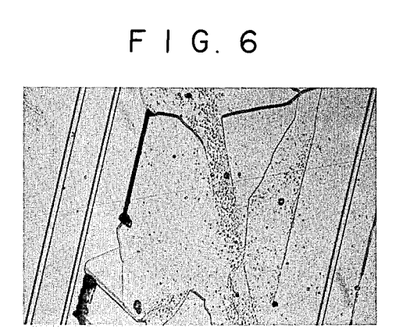

A fragment of the thus obtained semiconductor thin film was rendered to the microscopical examination. Remarkable anisotropy of the cyrstal configuration was observed and that many twins grown were found. When the observation was directed to individual single crystal regions, it could be seen that some crystals had a thickness or transverse diameter smaller than 5 microns. However, the longitudinal diameter thereof in average far exceeded the value of 100 microns. In particular, it has been found that at least a single crystal region having longitudinal diameter of at least 30 microns exists without fail in the active area of the element effective for the magnetic head. FIG. 6 is a microscopical photograph taken at 400 magnifications showing the congfigurations and sizes of crystals of the indium antimonide thin film after having been subjected to the zone melting treatment subsequently to the evaporation.

The galvano-magnetic characteristic of the Hall element was examined with the control current $I_H$ of 10 mA and the magnetic flux density B of 3G. Under these conditions, it was found that the Hall electromotive force $S = 1.0 \pm 0.1$ mV and the current noise $N = 0.4 \pm 0.1$ $\mu$V at the frequency band ranging from 50 Hz to 10 KHz. These values are adequate for the Hall element to be employed in the practical magnetic head for reproducing the signal from a recording tape with a good SN ratio.

As in the case of the preceding example, the Hall element prepared in the manner as above described was build in a magnetic head and the performances thereof were measured. With the control current $I_H$ of 10 mA, the electromotive force S' of $2.7 \pm 0.2$ mV and the current noise N' of $0.4 \pm 0.1$ $\mu$V were resulted. This means that a satisfactory SN ratio can be attained for a practicable magnetic head.

It will be appreciated that the current noise of the semiconductor magnetic head according to the present invention can be reduced to less than one-half or one-third of that of the semiconductor magnetic head prepared in accordance with the conventional method typically exemplified by the preceding example. It is important to note that the above desirable results can not be obtained when the longitudinal diameter of the crystal particle is less than 30 $\mu$m. In other words, it is an indispensable requirement for the magnetic head of little current noise to use a semiconductor element consisting of polycrystalline film containing therein at least one single crystal region having a longitudinal diameter of at least 30 microns. The inventive magnetic head can be manufactured very easily as is obvious from the above description.

EXAMPLE 2

In the experiment of the preceding Example 1, the composition of InSb was not used at the stiochiometric ratio but antimony was in excess of 3 weight %. Consequently, excessive deposition of Sb was observed on the overall film subjected to the zone melting treatment, and the average composition thereof was in the order of 1 weight % except for the terminated portion of the molten region. With the thin film containing such anisotropical structure, good results could be obtained as in the case of Example 1. In more detail, at least a crystal particle of a longitudinal diameter of at least 30 microns was surely present in the portion of indium antimonide and the current noise of such element or magnetic head composed of such element was in the order of 0.4 $\mu$V. This is a satisfactory value.

As will be appreciated from the foregoing description, the inventive magnetic head in which the thin film of semiconductor material undergone the zone melting treatment is employed as the magneto-sensitive element exhibits excellent performances or characteristcs as compared with the conventional magnetic heads. Besides, it has been discovered that the characteristics or performances of the inventive magnetic head as well as the yield thereof are remarkably improved and enhanced by interposing a special intermediate layer between the semiconductor thin film and the high permeability substrate. As found experimentally, the zone melting treatment of the semiconductor thin film deposited on the high permeability substrate will sometimes bring about spherical condensation of the molten semiconductor material. Although such phenomenon will not happen frequently, the spherical condensation of the semiconductor thin film makes the film utterly useless for the magneto-sensitive element of the magnetic head. Accordingly, in order to manufacture the magnetic heads at a high yield, such undesirable tendency should be suppressed in any case. In this connection, it has been discovered that such condensation can completely be excluded by interposing between the semiconductor thin film and the high permeability substrate an intermediate layer or film of alumina or film containing at least a fractional part of alumina.

For the purpose of inhibiting the tendency of the semiconductor thin film being spherically condensated, there has prior been proposed a method of zone melting the semiconductor thin film, according to which method the surface of the semiconductor thin film is previously oxidized and the thus produced oxide layer is used as a protection layer during the zone melting treatment. Although this method is certainly effective to some degree, it can not suppress completely the spherical condensation of the semiconductor thin film. There exists thus a demand for a more excellent method.

According to the inventive method wherein a film consisting of or containing alumina is interposed between the semiconductor film and the high permeability substrate as the intermediate layer, the tendency of the semiconductor thin film becoming spherical is completely inhibited, whereby the difficulty from which the hitherto known method as above mentioned suffers is throughly eliminated by the invention.

The provision of the intermediate layer according to the invention provides additional advantages that the tendency of the semiconductor thin film becoming dendrite is also prevented, so that, upon zone melting treatment of the film with electron beam, the moving speed of the beam can be increased so as to enhance the productivity, and that the adhesion of the semiconductor thin film after the zone melting treatment can be high improved when compared with the case in which no intermediate layer is employed.

Material which can be used for the intermediate layer according to the invention may be alumina alone or a composition containing alumina such as No. 7059 glass manufactured by Corning Glass Works in U.S.A.

The quantity of alumina contained in the intermediate layer has to be not less than 3 mol %. When the content of alumina in the intermediate layer lies in the range from 3 to 100 mol % inclusive a uniform or homogeneous semiconductor thin film can be produced after the zone melting treatment. On the contrary, if the intermediate layer dose not contain alumina at all or contains less than 3 mol % of alumina, there may occur sometimes non-uniform or non-homogeneous film in which insular spots appear. It is thus essential for the intermediate layer according to the invention that the content of alumina in the layer is not less than 3 mol %.

EXAMPLE 3

A substrate or base plate of ferrite was coated on the smoothed surface thereof with a layer of No. 7059 glass manufactured by Corning Glass Works and commercially available (which contain 12 mol % of alumina) by a sputtering method at a thickness of 1 $\mu$m and subsequently indium antimonide film slightly in excess of indium was evaporated onto the glass layer. The thus produced specimen was heated in the presence of oxidizing atmosphere to thereby form a protection film of $In_2O_3$ and $SiO_2$. The specimen was thereafter subjected to the zone melting treatment by means of a heated nicrom fine wire 20 in the atmosphere of helium gas in such manner as afore described with reference to FIG. 4b. The moving speed of the heat wire 20 was selected at 10 $\mu$m/sec. The yield of the thin films of good quality produced by the above zone melting process was substantially equal to 100 %. The film was high homogeneous with most of crystal particles having diameters of 0.5 to 3 mm being oriented in the same direction. The mobility of electron in the finished film was from 45000 to 65000 ($cm^2$/V·S) at the room temperature which approximates to the mobility in a single crystal bulk. At this point, it is to be noted that, so far as the inventors know, there have been no reports that the thin film of InSb could successfully be produced on the substrate of ferrite by the zone melting treatment. At any rate, the above experimental results suggest that the present invention has a greate utility in this technical field and contributes to the progress in the art.

EXAMPLE 4

In the preceding Example 3, the intermediate layer was formed of alumina by the sputtering method. The yield of the useful films produced by the zone melting treatment was about 100 %, which is very satisfactory as was in the case of Example 3. An advantage of using alumina as the material for the intermediate layer instead of No. 7059 glass of Corning Glass Works also can be seen in the fact that the control of the zone melting treatment may be much facilitated.

EXAMPLE 5

Figure 7:
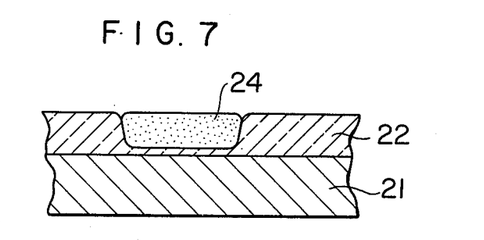
FIGS. 7 and 8 are views to illustrate embodiments of the present invention.
Figure 8:
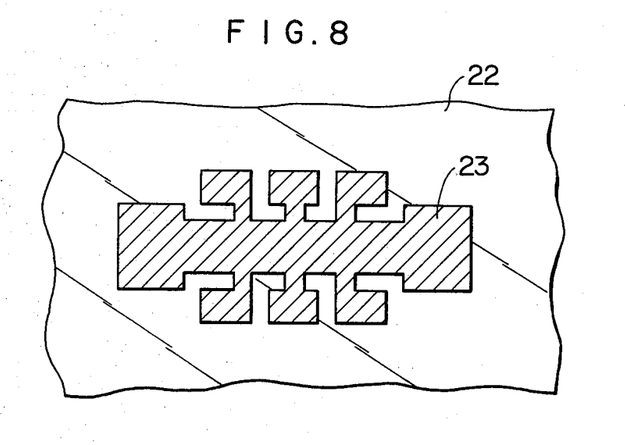

As is shown in FIG. 7, an intermediate layer of No. 7059 glass of Corning Glass Works was deposited at 2.5 $\mu$m in thickness on the smoothed surface of a ferrite substrate 21 by the sputtering. A recessed portion 23 having a contour such as shown in FIG. 8 was formed in the glass layer 22 by a photo-etching process. Subsequently, a film of InSb was formed by the evaporation on the whole surface of the glass layer at 2.4 $\mu$m in thickness and then the product was subjected to the zone melting treatment. Finally, photo-etching was carried out in such a manner that only the portion 24 of an InSb film lying in the recessed portion 22 of the substrate may remain unremoved, as can be seen from the fragmental sectional view of FIG. 7. From the measurement of characteristic of the InSb thin film element thus produced and having the contour shown in FIG. 8, it was found that the mobility of electron in this element at the room temperature was from 45000 to 60000 ($cm^2$/V·S)

The above described Examples 3, 4 and 5 tell that the use of the composition containing more than 3 mol % of alumina therein as the intermediate layer allows the facilitation of the zone melting treatment of the InSb thin film. The following Examples 6 and 7 are to show that the inventive method can be extensibly applied to the manufacturing of Hall elements.

EXAMPLE 6

In the Example 3, a plate No. 7059 glass of Corning Glass Works or of alumina and having a polished surface exhibiting a mirror-like reflection was used as the substrate which was destined to serve at the same time as the intermediate layer. In this case, the control of the zone melting treatment was further facilitated and the removal of In evaporated in excess could be more effectively made, as compared with the Examples 3 and 4. Further, the crystal particles as produced were relatively larger than those obtained when the substrate is formed of ferrite. The mobility of electron was in the range from 50000 to 65000 ($cm^2$/V·S).

EXAMPLE 7

A substrate or base plate made of No. 7059 glass of Corning Glass Works has coated with a thin film of InSb at 20 $\mu$m in thickness by evaporation. Through a well known hot wire zone melting process, crystal particles of InSb film was grown to gross sizes and a homogeneous film of InSb was resulted. The thin film of InSb thus obtained from the above zone melting treatment was then photo-etched to form a Hall element and the galvano-magnetic effect of the element was measured. The results showed that the mobility of electron $\mu_H$ at the room temperature was in the range of 30000 to 60000 ($cm^2$/V·S) and the Hall coefficient $R_H$ was ranging from 200 to 400 $cm^2$/C. The above measured value of $\mu_H$ is equivalent to 40 to 70 % of that of a single crystal, while the value of $R_H$ is substantially the same as that of the single crystal. Another advantage of the method of manufacturing the Hall element according to the invention can be seen in the fact that the thickness of the Hall element may be arbitrarily selected at a value falling within the range of 0.5 to 10 μm, because the element can be produced starting from the thin film itself. For this reason, a thin film element having physical properties approximately same as those of the element of a single crystal material can be obtained with higher precision and better yield than the latter which is made by foiling a bulky single crystal. In other words, a Hall element of high product sensitivity and capable of producing a high output can be easily manufactured according to the invention.

Although the InSb Hall element has been dealt with in this Example, it will of course be appreciated that the invention may be applied to any elements of which the galvano-magnetic effect conversion mechanism is attributable to a so-called magnetic resistance effect. Accordingly, the invention will never be restricted to the use of InSb for the intended thin film element but can be applied to any materials which exhibit a remarkable galvano-magnetic effect with conversion factor increased as the size of crystal particle is enlarged. For example, InAs, InBi, AlSb, GaSb, Ge or the like can be employed in carrying out the invention.

From the Examples 6 and 7, it has now become apparent that a generally known Hall element can be improved in respect of the galvano-magnetic effect by manufacturing the Hall element in accordance with the teaching of the invention. Another important feature of the magnetic head according to the invention resides in the fact that the current noise can be remarkably reduced.

Heretofore, there have been many reports as to the advantages brought about by applying the Hall effect element to a magnetic head. However, almost no practicable magnetic heads utilizing the Hall effect (hereinafter called simply a Hall head) have been developed in the past. In particular, this is true of the head for audio-frequency applications. Such situation may be explained from various aspects. One of the greatest obstacles to the developement of such Hall head can be seen in the fact that the hitherto known thin film Hall element could not be evaded from a high current noise, which prevented a practically required SN ratio from being attained. This difficulty can be utterly eliminated in case of the Hall head manufactured according to the present invention, which will be made more apparent in the description of the following Examples.

EXAMPLE 8

In order to effectively utilize a small flux signal in a magnetic head, magnetic cores therefor have to be constructed correspondingly suitably for that purpose. To this end, the Hall element for the Hall head is formed on a substrate or base plate of ferrite. In this Example, a plate of Ni—Zn ferrite which had been polished up to a level of mirror refletion was employed as the substrate, as was in the case of Examples 4 and 5. Glass of No. 7059 of Corning Glass Works was deposited on the polished surface of the substrate by the sputtering method. Examination of the deposited film with the aid of an X-ray micro-analysis showed that the film contained 13 mol % alumina (the content of alumina in the starting glass material was 12 mol %). It should be recalled that one of the essential requirements for the invention is that the sputtered film must contain not less than 3 % of alumina.

On the substrate as obtained, a film of InSb having a thickness of 20 μm was deposited by a threetemperature evaporating method. This film was then subjected to the zone melting treatment by the hot wire method and the film of oxides formed on the surface of the InSb film was removed by the buff polishing. Upon examination of the crystal particle size of the zone-molten film after having been etched with an etching solution for making appearances of grain boundaries or crystalline interface, it has been observed that the longitudinal diameters of the crystal particles (along the longitudinal axes thereof) were of values of at least 30 μm.

A Hall element having a desired configuration was formed from the thin film of InSb by photo-etching process and, after having been passivated by providing a film of $SiO_2$, contacts were formed by superposed evaporated films of Cr—Al to finish a Hall element for a magnetic head.

For the purpose of focusing or concentrating the signal magnetic flux onto the Hall element, a counterpart piece of Ni—Zn ferrite having a high permeability as the substrate material was adhered to the Hall element. When occasion requires, grooves may be formed between the Hall elements and magnetic shield plates of permalloy may be disposed in the grooves to thereby suppress possible cross-talks between the Hall elements in the multi-channel magnetic head. Subsequently, connections were provided between the contacts consisting of superposed films of Cr—Al and a suitable terminal plate and thereafter the Hall element assembly thus built in the substrates was contained within an appropriate shield casing. A moldable resin was poured into the shield casing, whereby the Hall element assembly was embedded within the resin block. Finally, the surface of the head with which a magnetic tape slidably contacts was polished to complete the playback magnetic head of a Hall effect type which may be of a multi-channel type such as for four channels.

when the above magnetic head comprising the Hall elements was employed for the reproduction of signals recorded on a usual magnetic tape for audioapplication (magnetic flux of 20 m Maxwel/mm) with control current of 20 mA fed to the Hall element, output voltage of 1.2 mV (r.m.s.) was obtained at the frequency of 400 Hz. Noise produced by the Hall element amounted at most to 10 μV (r.m.s.) in the frequency range of 40 Hz to 12 KHz and the SN ratio was at 62 dB. These results show that the Hall head according to the invention can be satisfactorily employed in practice for the reproduction of audiofrequency signals.

EXAMPLE 9

Five kinds of substrates having different contents of alumina were coated with respective films of InSb and, after having been subjected to the zone melting treatment, examined in respect of influences caused by differences in the contents of alumina of the substrates. The types and compositions of main components of the substrates are listed in the following Table 1.

Table 1

| Substrates | Components | Contents (mol %) |
|---|---|---|
| Alumina | $Al_2O_3$ | 100 |
| Silimanite | $Al_2O_3$ | 50 |
|  | $SiO_2$ | 50 |
| No. 7059 Glass | $Al_2O_3$ | 12 |
| (manufactured by | $SiO_2$ | 50 |

Table 1-continued

| Substrates | Components | Contents (mol %) |
| --- | --- | --- |
| Corning Glass Works) | BaO | 25 |
| | $B_2O_3$ | 13 |
| Quartz containing | $Al_2O_3$ | 2 – 5 |
| alumina* | $SiO_2$ | 95 – 98 |
| Quartz | $SiO_2$ | 100 |

*This substrate was prepared from starting material of mixed alumina and quartz by a high frequency sputtering method.

A thin film of InSb was deposited at 20 μm in thickness on each of the above listed substrates by the three-temperature evaporation method and thereafter subjected to the zone melting treatment by the well known hot wire melting method to thereby grow crystal particles of an InSb film to gross sizes. In the substrates of alumina, silimanite and the No. 7059 Glass all of which contain more than 12 mol % of $Al_2O_3$, the homogeneous films of InSb were obtained by zone melting treatment. In case of the substrate of quartz containing no alumina at all, the film of InSb was cracked into discrete insular portions having diameters of 1 to 5 mm and homogeneous film could not be obtained. In the substrate of quartz glass containing alumina, a contiguous film was formed substantially all over the surface of the substrate having a size of 30 mm × 30 mm. However, insular or island-like spots having diameters of 1 to 3 mm were observed here and there. Examination of these spots as to their contents of $Al_2O_3$ by means of an X-ray micro-analyzer, it was found that the content of $Al_2O_3$ was less than 2 mol %. The result obtained from the experiment of the substrate consisting of the alumina containing quartz glass shows that the material for the substrate must contain not less than 3 mol % of $Al_2O_3$ in order that the crystal particles of an InSb film be grown to a particle size of at least 30 μm by the zone melting treatment and that the thin film be perfectly continuous all over the surface of the substrate. It is apparent that, in the case of No. 7059 glass substrate, content of 12 mol % of $Al_2O_3$ plays an essential role in forming the continuous film. Additionally, galvanomagnetic properties of these substrates were examined. In the substrate containing not less than 3 mol % of $Al_2O_3$ after the zone melting treatment, the mobility of electron $\mu_H$ was greater than 30000 cm$^2$V·S which is higher than 40 % of the mobility in a single crystal and exceeds the mobility of electron in the purely evaporated substrate. Furthermore, when glass of No. 7059 containing 12 mol % of alumina was deposited on the ferrite substrate by the sputtering and the film of InSb was formed thereon by the evaporation, which was thereafter subjected to the zone melting treatment, $\mu_H$ of 50000 cm$^2$/V·S could be attained. This Hall element had a high product-sensitivity and exhibited a good conversion efficiency. In particular, it has been found that the Hall element formed on the ferrite substrate is characterized by a great flux concentrating effect and a low current noise and can be most advantageously employed for a device requiring a high SN ratio such as a magnetic head.

From the foregoing discussion, it is safe to say that the Hall head comprising a Hall element which is manufactured from the film of InSb containing crystal particles of a size greater than 30 μm and formed on an insulation film containing more than 3 mol % of alumina can provide a high SN ratio which can not be attained by the hitherto known thin film Hall head.

We claim:

1. In a semiconductor magnetic head comprising a first substrate of a magnetic material having a high permeability, a magneto-sensitive element composed of a semiconductor film provided on said first substrate through a first insulation film interposed therebetween, lead wires connected to said magneto-sensitive element and a second substrate of a magnetic material having a high permeability formed so as to cover said magneto-sensitive element through a second interposed insulation film, the improvement residing in that said magneto-sensitive element is composed of a polycristalline thin film containing at least a crystal particle having a longitudinal diameter of at least 30 μm.

2. A semiconductor magnetic head as set forth in claim 1, wherein said magneto-sensitive element is selected from a group consisting of Hall elements and magnetic resistance elements.

3. A semiconductor magnetic head as set forth in claim 1, wherein said semiconductor is selected from a group consisting of InSb, InAs, InBi, AlSb, GaSb and Ge.

4. A semiconductor magnetic head as set forth in claim 1, wherein said magneto-sensitive element is deposited on a film of alumina or an insulation film containing alumina.

5. A semiconductor magnetic head as set forth in claim 4, wherein said insulation film contains 3 to 100 inclusive mol % of alumina.

6. A semiconductor magnetic head as set forth in claim 4, wherein said semiconductor magneto-sensitive element is selected from a group consisting of Hall elements and magnetic resistance elements.

7. A semiconductor magnetic head as set forth in claim 4, wherein said semiconductor is selected from a group consisting of InSb, InAs, InBi, AlSb, GaSb and Ge.

8. In a magnetic head including at least one substrate of a magnetic material having a high permeability, said substrate having a layer of insulating material on one surface of said substrate, and a Hall element disposed at said one surface, the improvement comprising said Hall element including a thin layer of polycrystalline semiconductor material disposed on said insulating material at said one surface, said polycrystalline material having at least one single crystal area having a dimension in the plane of said thin film layer of at least 30 μm such that said Hall element has the property of a signal-to-noise ratio of less than ⅓ to ½ that of a conventional Hall element.

9. A magnetic head according to claim 8, wherein said polycrystalline material has a plurality of single crystal areas, each single crystal area having said dimension exceeding 30 μm such that the average value of said dimension for all of said single crystal areas exceeds 100 μm.

10. A magnetic head according to claim 9, wherein said layer of insulating material includes alumina.

11. A magnetic head according to claim 10, wherein alumina is present in said insulating layer in an amount of 3 to 100 mol%.

12. A magnetic head according to claim 9, wherein said layer of insulating material is provided with a recess containing said thin film layer of polycrystalline semiconductor material, said recess having a configuration corresponding to the shape of said Hall element.

13. A magnetic head according to claim 9, wherein said magnetic material of said substrate is a ferrite, and said semiconductor material is InSb.

14. A magnetic head according to claim 8, wherein said layer of insulating material includes alumina.

15. A magnetic head according to claim 14, wherein alumina is present in said insulating layer in an amount of 3 to 100 mol%.

16. A magnetic head according to claim 8, wherein said layer of insulating material is provided with a recess containing said thin film layer of polycrystalline semiconductor material, said recess having a configuration corresponding to the shape of said Hall element.

17. A magnetic head according to claim 8, wherein said magnetic material of said substrate is a ferrite, and said semiconductor material is InSb.

* * * * *